United States Patent [19]

DiLeo et al.

[11] Patent Number: 4,789,482

[45] Date of Patent: Dec. 6, 1988

[54] METHOD FOR SEPARATING LIQUID COMPOSITIONS ON THE BASIS OF MOLECULAR WEIGHT

[75] Inventors: Anthony J. DiLeo, Westford; Gastón de los Reyes, Framingham, both of Mass.

[73] Assignee: Millipore Corporation, Bedford, Mass.

[21] Appl. No.: 828,106

[22] Filed: Feb. 10, 1986

[51] Int. Cl.⁴ .............................................. B01D 13/00
[52] U.S. Cl. ................... 210/651; 210/195.2; 210/321.65; 210/805; 210/808
[58] Field of Search ............... 604/5, 6; 210/257.2, 210/259, 295, 321.1, 433.2, 500.23, 639, 641, 651, 927, 371.65, 805, 808, 195.2

[56] References Cited

U.S. PATENT DOCUMENTS

| | | | |
|---|---|---|---|
| 3,228,877 | 1/1966 | Mahon | 210/500.23 X |
| 4,350,156 | 9/1982 | Malchesky et al. | 604/6 |
| 4,397,747 | 8/1983 | Ikeda | 210/259 X |
| 4,540,492 | 9/1985 | Kessler | 210/651 |

FOREIGN PATENT DOCUMENTS 2065129  6/1981  United Kingdom.

OTHER PUBLICATIONS

Shettigar et al., "Continuous Enrichment of Albumin in Relation to Globulins in Plasma", *Artificial Organs*, May 1982, pp. 163–168.

Gurland, H. J. et al., "Comparative Evaluation of Filters Used in Membrane Plasmapheresis" Nephron 36: pp. 173–182 (1984).

*Primary Examiner*—Richard V. Fisher
*Assistant Examiner*—W. Gary Jones
*Attorney, Agent, or Firm*—Andrew T. Karnakis; Paul J. Cook

[57] ABSTRACT

An ultrafiltration device comprising hollow fibers or thin channels through which ultrafiltration of blood plasma is effected is operated under conditions of tangential flow and low conversion. A recirculation stream of high molecular weight fraction of the liquid stream is fed to the device and a permeate stream from the device is recovered. The optimum module aspect ratio is designed and the corresponding maximum shear rate of incoming liquid is specified and controlled so as to provide maximum separation efficiency (selectivity and flux) allowing for separation between species of similar size or molecular weight. Shear rate is controlled by controlling the recirculation stream flow rate. The ratio of the transmembrane pressure at the channel outlet to the transmembrane pressure at the channel inlet resulting from the optimal design and operation is also specified.

3 Claims, 3 Drawing Sheets

EXTRACORPOREAL CIRCUIT

METHOD FOR SEPARATING LIQUID COMPOSITIONS ON THE BASIS OF MOLECULAR WEIGHT

BACKGROUND OF THE INVENTION

This invention relates to a method and apparatus for separating plasma into a high molecular weight plasma component and a low molecular weight plasma component utilizing porous hollow fiber on thin channels having membrane walls.

Presently, liquids can be separated into a high molecular weight component and a lower molecular weight component by being passed along thin channels having membrane walls or porous hollow fibers when the membranes of the hollow fibers have a pore size which exclude the high molecular weight component while permitting passage therethrough of the low molecular weight component. In human blood plasma, the separation of the mixture by ultrafiltration is limited by the layer of the high molecular weight component concentrated on the membrane or fiber surface as a result of concentration polarization. Membranes are selected which allow substantial permeation of the albumin portion of the plasma while simultaneously achieving substantial rejection of globulins. It has often been observed that many membranes have these properties when tested with albumin alone or globulin alone. However, in the vast majority of cases, when the albumin and globulins are mixed together, the permeation of albumin is reduced while the globulins continue to be substantially rejected. This undesirable effect becomes more pronounced the higher the flux and/or the higher the concentration of globulins in the mixture. For this reason, ultrafiltration has been used almost exclusively as a concentration tool, since systems that reliably separate species based on the molecular size have not been possible especially when the species are of similar molecular size as in the case of albumin and globulins.

To circumvent the effects of concentration polarization, several processes have been developed which modify the feed plasma source to improve liquid flux and selectivity. For example, Ohno et al in U.K. patent application No. 2,065,129 discloses a separation process in which serum is diluted to reduce total protein and salt concentration while the pH is adjusted to between 3.8 and 4.7 prior to ultrafiltration.

Baeyer et al in the Journal of Membrane Science, 22 (1985) 297–315, discloses a process in which the plasma is first diluted by a factor of 12 prior to ultrafiltration. Malchesky et al in U.S. Pat. No. 4,350,156 discloses a process for removing macromolecules from plasma by cooling the plasma to about 10° C. and then filtering the macromolecules from the cooled plasma to form a filtered low molecular weight plasma stream. This process does not utilize an ultrafiltration membrane.

It would be desirable to provide an ultrafiltration process utilizing open thin channels which effects passage of a lower molecular weight species through an ultrafiltration surface from a mixture of high molecular weight species and low molecular weight species at a level approaching that achieved with solutions containing a single low molecular weight species. In the case of plasma treatment wherein albumin is separated and recycled to a patient, it would be desirable to attain the highest albumin permeate flow rate through the separation membrane with a minimum extracorporeal volume (membrane area).

SUMMARY OF THE INVENTION

Figure 1:
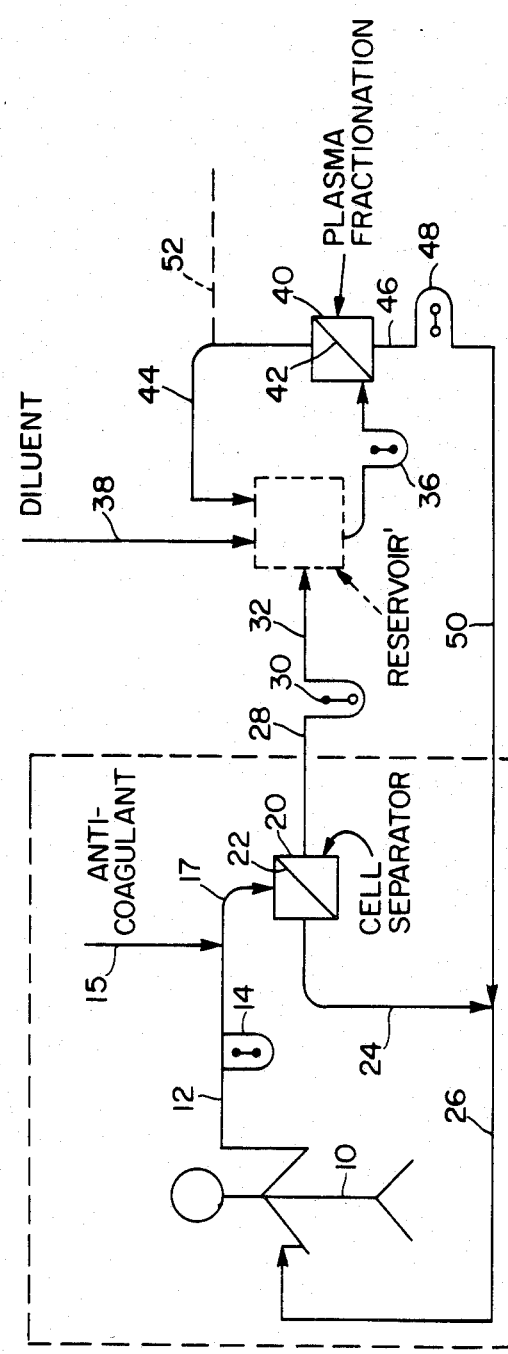
FIG. 1 is a schematic view of a plasmapheresis and plasma separation system utilized in the present invention.

This invention is based upon the discovery that in the design and operation of ultrafiltration modules it is necessary to control both the aspect ratio (ratio of channel length to channel height or fiber radius) of the separation module and the operating conditions of fluid shear rate in order to achieve maximum selectivity between the high molecular weight species and the low molecular weight species while minimizing membrane area. Selectivity is defined as the ratio of the concentration of low molecular weight species to that of the high molecular weight species that passes through the ultrafiltration surface. The process of this invention can be conducted in any ultrafiltration application which is operated at low volumetric conversions, defined as the ratio of the volume of fluid removed as permeate to the volume traversing the membrane surface in any single pass. As a consequence of this low conversion the concentration of species in the bulk retentate remains nearly constant, (within plus or minus 10 percent from the ideal value). The process of this invention includes a recirculation stream wherein a portion of the separated high molecular weight fraction is recirculated to the channel or fiber inlets. The desired shear rate is attained by controlling (a) the ratio of transmembrane pressure at the channel or fiber outlet to the transmembrane pressure at the channel or fiber inlet and (b) the ratio of recirculation stream flow rate to the permeate stream flow rate. At the desired concentration of species in the bulk retentate this invention makes it possible to accurately maintain the flux of the low molecular weight component flow through the separation membrane by the proper control of the recirculating flow rate and permeate flow rate.

DESCRIPTION OF SPECIFIC EMBODIMENTS

Simultaneous control over both the module aspect ratio and the corresponding module operating conditions enable strict control over the extent of concentration polarization to be achieved. For a given channel dimension of length and height a shear rate which is too low results in significant concentration polarization over the entire membrane surface and a loss in both flux and separation selectivity. When utilizing a shear rate which is too high, fluid backflow will result. Thus by simultaneously optimizing both the module aspect ratio and the operating shear rate the ultrafiltration module performance, high volumetric flux, low membrane area and high selectivity is controllable, reproducible and stable.

The separations attainable with the present invention are not limited to a concentration process wherein the low molecular weight species differs in molecular weight from the high molecular weight species by a factor of 8 or more. The separations attainable include separations of species wherein the molecular weights are not widely different such as albumin from IgG. The ultrafiltration membrane utilized in the process of this invention has a thin skinned surface while the remainder acts as a very open-pore support structure. These membranes as well as the hollow fibers have retention cut-offs from about 1,000 to about 1,000,000 nominal molecular weight limit (NMWL).

The optimum module aspect ratio is dependent upon the type of separation channel or fiber utilized and is dependent upon proportionality constants, as defined below, and the hydraulic permeability of the membrane being used. The equations set forth below include constants that are determined experimentally by optimizing the recirculation and permeate flow rates, by the procedure set forth below. The procedures for determining the aspect ratio and shear rates give optimum values. It is to be understood that it is within the scope of this invention to include values within plus or minus 10 percent of these optimum values since it is difficult to operate at exactly the optimum values due to variance of conditions such as variances in pump output or possible channel blockage. As used in the claims, the phrase "substantially the aspect ratio" is meant the L/h calculated by Equation 1, plus or minus 10 percent. By the phrase "substantially the shear rate" as used in the claims is meant the maximum shear rate calculated by Equation 2, plus or minus 10 percent.

For optimal performance, the module aspect ratio is given by:

$$\frac{L}{h} = \left[ \frac{K}{12\,\rho\mu} \; \frac{h}{L_p} \right]^{\frac{1}{2}} \qquad \text{Equation 1}$$

K is a function of the ratio of the transchannel pressure drop to the average pressure in the channel. K is obtained experimentally by the procedure set forth below. h is the channel height or the hollow fiber radius, $\rho$ is the ratio of the recirculation stream flow rate, $Q_R$, to the permeate stream flow rate, $Q_P$, $\mu$ is the viscosity of the incoming plasma being separated, L is the length of the channel or fiber and $L_P$ is the membrane hydraulic permeability after the membrane is wet with the liquid to be ultrafiltered.

Figure 4:
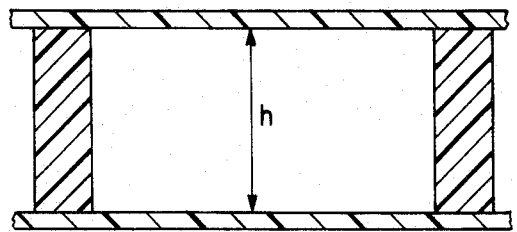
FIG. 4 is a cross-sectional view of a rectangular channel of the apparatus of the FIGS. 1, 2 and 3.
Figure 5:
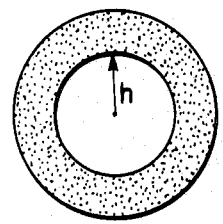
FIG. 5 is a cross-sectional view of an ultrafiltration hollow fiber which can be utilized in the present invention.

For channels of rectangular geometry having at least one wall formed of a porous membrane, h is the distance between the membranes which define the height of the channel shown in FIG. 4. Generally h for the rectangular channels is between about 0.0100 and 0.030 cm. In hollow fiber cylindrical geometry, h is the radius of the fiber lumen shown in FIG. 5 and is generally between about 0.0150 and 0.025 cm. In the present invention, the module aspect ratio, L/h, can range between about 50 and 5000, preferably between about 100 and 300.

The unique features of this invention is that the module aspect ratio and module operating shear rate are simultaneously optimized to achieve the desired selectivity at the largest possible flux. Unlike conventional systems, the system of this invention does not operate either at an excessively large shear rate or an excessively low volumetric flux, but at conditions which maximize the desired selectivity which in the case of plasma is the plasma protein selectivity. An exact relationship has been found between the module aspect ratio and module operating shear rate which gives optimal separation performance.

The maximum shear rate to be utilized in the apparatus is defined by equation 2:

$$\dot{\gamma} = \frac{\rho^2 \, D^* \mu^{\frac{1}{2}}}{L_p^{\frac{1}{2}} h^{3/2}} \; \frac{1}{(1 + K)^2} \qquad \text{Equation 2}$$

wherein $\dot{\gamma}$ is the maximum shear rate to obtain optimal selectivity performance.

The proportionality constant, $D^*$, is obtained empirically by the following procedure:

A prototype module is provided containing a plurality of thin channels or hollow fibers of the type of ultrafiltration membrane to be utilized in the final apparatus. The channels or fibers in the prototype can be of any dimension. A prototype having channels with an L/h of about 200 has been found to be useful. Pumps and conduits are provided to form a flux stream to recover the low molecular weight component and to control the flow rate of the permeate, $Q_P$. This permeate stream is recombined in a feed reservoir with a recirculation stream comprising the high molecular weight component obtained from the ultrafiltration channels or fibers. The recirculation stream flow rate ($Q_R$) is controlled. A plurality of runs are made with the apparatus with either $Q_P$ being varied and $Q_R$ being maintained constant or $Q_R$ being varied and $Q_P$ being maintained constant. After each run, the separation performed (selectivity) between the species of interest is measured. After each run the system also is thoroughly flushed such as with saline or water to remove all treated liquid from the system. A standard hydraulic permeability, e.g. water or saline, $L_P$, is then measured by standard methods. The value then is multiplied by the ratio of $\mu$ of the treated liquid to $\mu$ of the standard fluid wherein $\mu$ is viscosity in centipoises and wherein $L_P$ is used in equation 1. From the selectivity values obtained, the optimum selectivity is identified and the $Q_P$ and $Q_R$ values which correspond to the optimum selectivity can be determined. The selected optimum value refers to the $Q_P$ and $Q_R$ values when both the flux and selectivity are maximized simultaneously. The constant K can be calculated using the optimum value of $Q_R/Q_P$ using Equation 1.

Using the shear rate corresponding to the optimum $Q_R$, The constant $D^*$ then can be calculated from equation 2. $D^*$ is a property of the solution being ultrafiltered and is between about $1 \times 10^{-7}$ cm²/sec and $25 \times 10^{-7}$ cm²/sec and preferably between about $5 \times 10^{-7}$ cm²/sec and $12 \times 10^{-7}$ cm²/sec. The limits on $\rho$ reflect the limits on the ratio, $Q_R/Q_P$. The upper limit is set by the size of the recirculation pump whereas the lower limit is set by the maximum increase in concentration which is allowable down the length of the ultrafilter at low values of $Q_R/Q_P$, i.e. at high conversions, (the retained species become more concentrated as permeate is removed). A maximum increase of 10 percent above the concentration at the inlet is permitted for the high molecular weight species in the retentate stream.

When an ultrafiltration device is designed and operated in accordance with equations 1 and 2, the total membrane area in the device which provides optimal separation efficiency is given by equation 3

$$A = \frac{0.25 \, Q_p L \, (1 + K)^2}{D^* K} \left[ \frac{\mu L_p}{h} \right]^{\frac{1}{2}} \qquad \text{Equation 3}$$

wherein A is the total membrane surface area.

Furthermore, the maximum transchannel pressure drop which can be measured directly is also given by equation 4 for optimal separation conditions $$\Delta P_C = \frac{2.0 \, D^* h^{\frac{1}{2}}}{(1 + K)^2 \, L_p^{3/2} L \mu^{\frac{1}{2}}} \qquad \text{Equation 4}$$

wherein $\Delta P_C$ is the transchannel pressure drop.

Control of the concentration polarization in a tangential flow module depends both upon a combined match between the module aspect ratio and operating shear rate. Therefore only a restricted range of module designs and of operating shear rate are feasible. This results in an upper and lower limit for the factors, L/h, and ρ. The ratio, ρ, of recirculation stream flow rate, $Q_R$, to permeate stream flow rate $Q_P$, is between about 5 and 100, preferably between about 10 and 50 and most preferably 30.

Finally, with the optimal design, L/h, and operating conditions, $\bar{\gamma}$, the ratio of the transmembrane pressure drop at the channel outlet to the transmembrane pressure drop at the channel inlet, $$\beta = \frac{TMP_{Outlet}}{TMP_{Inlet}}$$

is significantly different from 1.0. The value of β derived from this invention lies between 0.0 and 0.85, most typically 0.75.

The following example illustrates the present invention and is not intended to limit the same.

EXAMPLE 1

The module aspect ratio and operating conditions were optimized by the above-described procedure for the separation of IgM from albumin in human plasma using a polyvinylidine fluoride ultrafiltration membrane having an NMWL of 500,000. The optimum value of $D^*$ determined emperically is $8.5 \times 10^{-7}$ cm$^2$/sec. yielding an optimum aspect ratio of L/h = 276 and maximum shear rate $\bar{\gamma} = 4250$ sec$^{-1}$ for h = 125 μm. This module would operate near 0.033 cm/min flux, require 0.14 m$^2$ membrane area and achieve a selectivity of $\Delta R = 0.8$ ($R_{ALB} = 0.10$ and $R_{IgM} = 0.90$) for plasmapheresis applications from which permeate flow rates of about 40 ml/min are required. This albumin rejection coefficient is equal to that measured for solutions of albumin alone with this membrane.

The separation between albumin and immune complexes in human plasma can also be achieved with the polyvinylidine fluoride membrane (assuming immune complexes to be on average twice the size of an IgG molecule). The optimum values for this separation using the preferred value of $D^* = 8.5 \times 10^{-7}$ cm$^2$/sec yielding L/h = 385
and $\bar{\gamma} = 3700$ sec$^{-1}$
for h = 150 μm This module would operate near 0.025 cm/min flux and achieve a selectivity of $\Delta R = 0.7$ ($R_{ALB} = 0.1$ and $R_{IgG} = 0.8$)

Finally, the separation between albumin and IgG in human plasma can also be achieved with the polyvinylidine fluoride membrane. The optimum values for this separation again using $D^* = 8.5 \times 10^{-7}$ cm$^2$/sec are
L/h = 276
$\bar{\gamma} = 4250$ sec$^{-1}$
for h = 125 μm This module would operate near 0.033 cm/min flux and achieve a selectivity of $\Delta R = 0.4$ ($R_{ALB} = 0.1$ and $R_{IgG} = 0.5$).

Referring to FIG. 1, a typical system in which the present invention is useful is shown.

A catheter which communicates with conduit 12 is inserted into the patient 10 in order to pump the blood from the patient 10 by means peristaltic pump 14. An anticoagulant is introduced into the system through conduit 15 into conduit 17. The whole blood containing anticoagulant is introduced into a cell separator 20 such as a centrifuge adapted to separate whole blood into its plasma component and into its cellular component. Any suitable means for separating the whole blood into its plasma component and cellular component can be utilized in the present invention. Typically, the plasma-cell separation can be effected by passing the whole blood into contact with a hollow channel having a membrane generally having a pore size of about between 0.05 and 1.0 microns, particularly membranes having a pore size of about 0.06 microns. When utilizing the volumetric flow rates set forth above, typical pressures across the ultrafiltration membrane in step 20 are usually between about 10 to about 100 mm Hg. The cellular blood component is directed through conduits 24 and 26 and reinjected into the patient 10. The plasma component is removed from cell separator 20 through conduit 28 by means of peristaltic pump 30 and passed through conduit 32 and to reservoir 34. A physiologically acceptable diluent is added to the reservoir 34 through conduit 38. The mixture of diluent and plasma is removed from reservoir 34 by means of peristaltic pump 36 and directed to a second separation step 40 wherein low molecular weight plasma fraction is separated from a high molecular weight plasma fraction by means of membrane 42. The high molecular weight plasma fraction is recycled to reservoir 34 by means of conduit 44. The low molecular weight plasma fraction containing albumin is removed from separation step 40 through conduit 46 by means of peristaltic pump 48 and is recycled to the patient 10 by means of conduit 50 and conduit 26. The rate of addition of diluent to reservoir 34 and the control of peristaltic pump 30, and 48 regulate the flow rates of the various plasma strength containing streams. In an alternative embodiment of this invention, a bleed stream 52 can be utilized in order to remove a portion of the high molecular weight plasma fraction from the system.

Typical operating conditions for the system shown schematically in FIG. 1 are as follows:

The peristaltic pump 14 is operated in order to effect whole blood removal from the patient at a flow rate between about 20 and about 180 ml/min. The anticoagulant such as heparin, ACD or anticoagulant citrate dextrose typically is added in aqueous solution at a flow rate through conduit 15 of about between 10 and about 50. The pump 30 which effects removal of the plasma fraction from separator 20 generally is operated to effect a flow rate in conduit 28 of about 5 and about 60 ml/min. The pump 48 which effects removal of the low molecular weight plasma fraction generally is operated to effect a flow rate in conduit 50 between about 10 and about 50 ml/min. diluent through conduit 38 to reservoir 34 at a rate required to maintain nearly constant protein concentrations in reservoir 34. For example, when the albumin return desired is 50 percent of that originally in the patient, typical flow rates are whole blood in conduit 12 of about 80 ml/min. anticoagulant in conduit 15 of about 10 ml/min., plasma flow rate in conduit 28 of about 30 ml/min, recirculated plasma in conduit 44 of about 1,000 ml/min, low molecular weight plasma fraction in conduit 50 of about 30 ml/min and flow rate of diluent initially of about 30 ml/min and gradually to 0 ml/min over a time period of about 1.5 hours. The process also can be operated without a diluent or anticoagulent with a liquid stream other then blood plasma such as fermentation baths.

Figure 2:
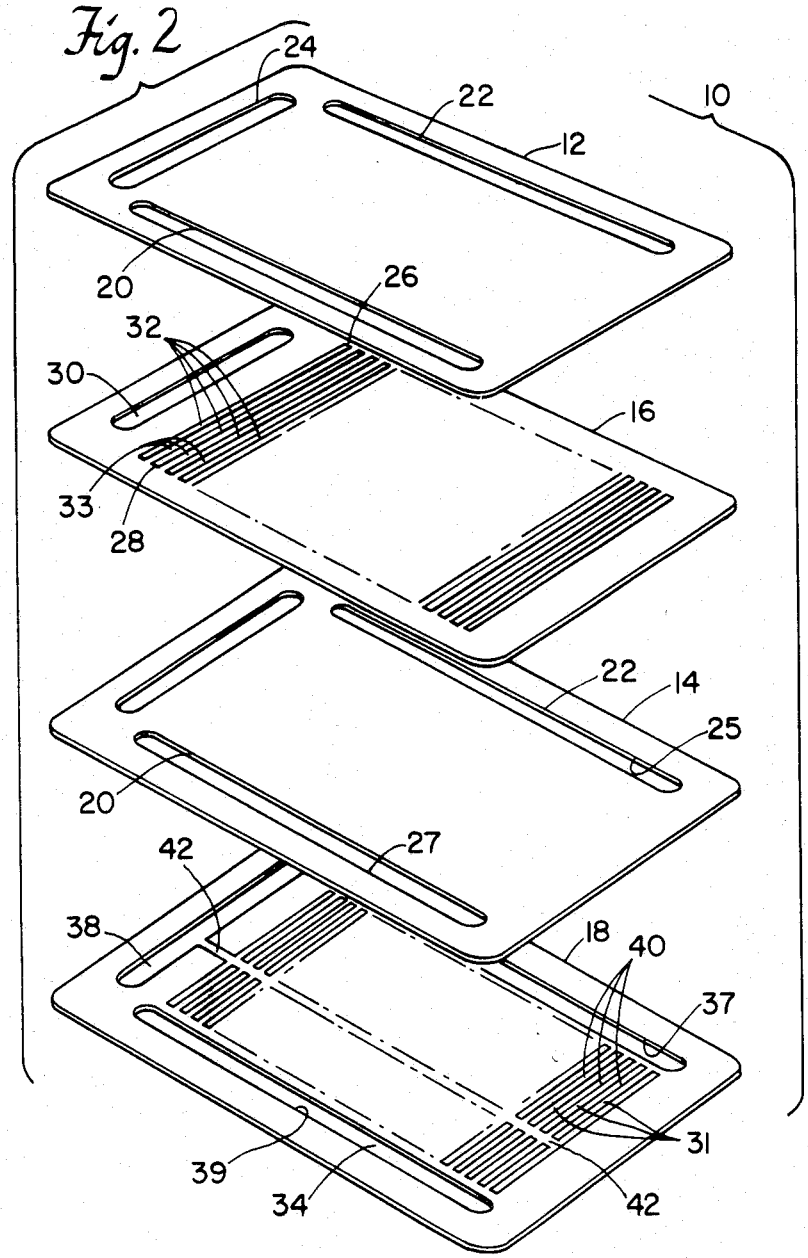
FIG. 2 is an exploded view of an ultrafiltration unit which can be utilized in the process of this invention.
Figure 3:
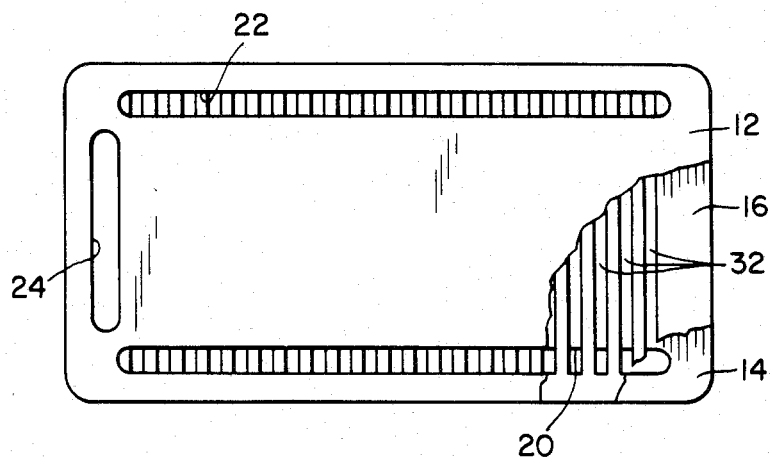
FIG. 3 is a top view of an ultrafiltration membrane and the first spacer of FIG. 2 in contiguous relationship.

Referring to FIGS. 2 and 3, a typical structure utilizing rectangular hollow channels (FIG. 4) is shown. This structure is disclosed by U.S. Pat. No. 4,540,492 which is incorporated herein by reference.

A filter unit 10 comprises, a first membrane 12, a second membrane 14, a first spacer 16, and a second spacer 18 which, when joined together from a plurality of rectangular channels (FIG. 4). The apparatus includes a plurality of filter units 10 which are positioned contiguous to each other and form a stack of filter units 10. Both the first membrane 12 and the second membrane 14 are of identical construction and are formed from an ultrafiltration membrane. Each membrane 12 and 14 is provided with two longitudinal channels 20 and 22 and a widthwise channel 24. The widthwise channel 24 is not in fluid communication with either of the channels 20 or 22. The first spacer comprises of plurality of channels 32 which extend from edge 26 to edge 28 an outlet channel 30. When membranes 12 and 14 are contiguous to spacer 16, the edges 26 and 28 coincide with the edges 25 and 27 respectively. The second spacer 18 is provided with a plasma inlet channel 34, a high molecular weight plasma outlet 36 and a widthwise low molecular weight plasma outlet channel 38. The second spacer 18 also is provided with interior channels 40 which provide fluid communication with channel 42 which in turn is in fluid communication with low molecular weight plasma outlet channel 38. When spacer 18 is juxtaposed to membrane 14, edges 37 and 39 coincide respectively with edges 25 and 27 of spacer 14. The spacer strips 33 between channels 32 and the spacer strips 31 between the channels 40 are bonded to the next adjacent membrane (not shown) and provide the necessary support for the membranes adjacent the channels so that membrane flexibility is controlled to maintain the desired channel height.

The channels 32 in first spacer 16 should have a particular height, width and length in order to accommodate the plasma produced from the normal blood flow rate from a donor so that blood can be removed continuously while enriched blood from which plasma has been removed and the low molecular weight plasma stream can be reintroduced continuously to the donor.

While the module structure shown in FIGS. 2 and 3 is useful in the present invention, it is to be understood that any ultrafiltration module having their channels formed with ultrafiltration membranes can be utilized in the present invention so long as the aspect ratio and operating condition are controlled in accordance with this invention as set forth above.

Referring to FIG. 3, the channels 32 of first spacer 16 are shown to overlap into channel 20 and 22 of membrane 14. This overlap permits introducing of whole blood into channel 20, passage of the whole blood lengthwise along channels 32 while being in contact with membrane 14 and removal of plasma depleted blood from channels 32 through widthwise channel 22.

What we claim is:

1. A process for separating a blood plasma into a high molecular weight stream and a low molecular weight permeate stream utilizing a separation module having separation means comprising a plurality of thin channels or hollow fibers having walls through which ultrafiltration is effected, said separation module having substantially an aspect ratio between about 50 and 5,000 and, defined by Equation 1

$$\frac{L}{h} = \left[ \frac{K}{12 \rho \mu} \frac{h}{L_p} \right]^{\frac{1}{2}} \quad \text{Equation 1}$$

said process comprising the steps of introducing said blood plasma into an inlet portion of said separation module at substantially a shear rate defined by Equation 2, $$\dot{\gamma} = \frac{\rho^2 D^* \mu^{\frac{1}{2}}}{L_p^{\frac{1}{2}} h^{3/2}} \frac{1}{(1 + K)^2} \quad \text{Equation 2}$$

removing said high molecular weight stream and said low molecular weight stream from said separation module, recirculating at least a portion of said high molecular weight stream to an inlet portion of said separation module thereby to form a recirculation stream, and controlling the ratio of the recirculation stream flow rate to the permeate stream flow rate to between about 5 and 100 and so that the ratio of the transmembrane pressure at the outlet to said separation means to the transmembrane pressure at the inlet of said separation means to between about 0.0 and 0.85 wherein the total membrane area in said module is defined by Equation 3

$$A = \frac{0.25 Q_p L (1 + K)^2}{D^* K} \left[ \frac{\mu L_p}{h} \right]^{\frac{1}{2}} \quad \text{Equation 3}$$

2. The process of claim 1 wherein the ratio of recirculation stream flow rate to permeate stream flow rate is controlled to between about 10 and 50.

3. The process of claim 1 wherein the ratio of transmembrane pressure at the outlet to said separation means to the inlet of said separation means is controlled to between about 0.70 and 0.85.

* * * * *